Figure 1:
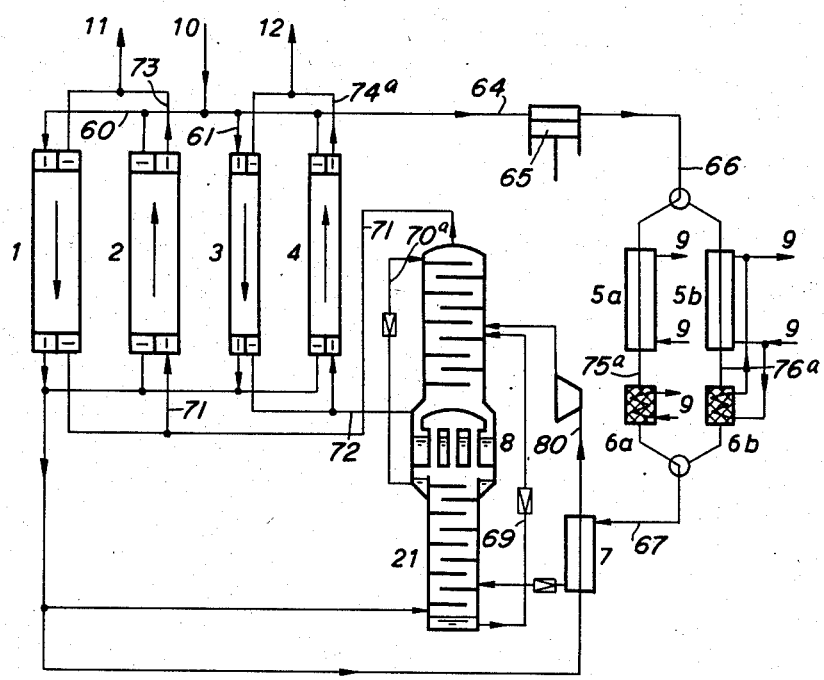

United States Patent Office 2,699,047
Patented Jan. 11, 1955

2,699,047

PROCESS FOR COOLING AND PURIFYING COMPRESSED GAS MIXTURES

Ernst Karwat, Pullach, near Munich, and Richard Linde, Munich-Solln, Germany, assignors to Gesellschaft Fuer Linde's Eismaschinen A.-G., Hoellriegelskreuth, near Munich, Germany Application October 27, 1950, Serial No. 192,582

3 Claims. (Cl. 62—175.5)

The invention relates to a process for cooling and purifying compressed gas mixtures and particularly compressed air for the purpose of its separation into components.

In conformity with this process the gas mixture is divided into main and divisional currents for the purpose to effect a complete removal of the impurities condensed in heat exchange.

It is a primary object of the invention to improve and to increase by a new manner of guiding the main and the divisional gas currents through heat exchangers and adsorbers the operative capacity of the cold generation.

It is another object of the invention to improve the economy of the gas separation into its components.

With these and additional objects in view, which will become apparent as the specification proceeds, the invention will now be described in the following.

In the separation of gas mixtures into their components by pressure and refrigeration, the act of separation is preceded by pre-purification and cooling. This cooling and the pre-purification is carried simultaneously in reversible heat exchangers of a known type, for instance regenerators or counter-current heat exchangers, which are alternatively traversed in equal cross-sectional areas by the gases to be cooled and heated. The revaporization of separated condensates at the cold end of the heat exchangers is impeded if equal weight quantities of the hot, unseparated gas mixture and of the cold separation products are fed into the exchangers for the purpose of cooling the former and heating the latter. The reason is that the compressed gases, especially at a low temperature, have a substantially greater specific heat than the non-compressed products of separation. Consequently, the temperature difference between products of equal weight entering and leaving the heat exchangers is substantially greater at the cold end than at any other part of the exchangers, and the revaporization of the separated condensates is impeded even if the required ratio between the volumes of the entering and leaving gases is maintained, in order to effect revaporization at medium and high temperatures.

These shortcomings have been remedied in various ways; for example, a part of the gas mixture to be separated has not been introduced through the cold accumulators, but its products of separation were discharged therethrough. A typical example of this process is the method of guiding high pressure air in the Linde-Fränke process of air separation. The air is not entered through the regenerators, but one portion of its separation product is discharged through the regenerators.

In another known method, the entire gas mixture to be separated is fed into the heat exchanger and an incompletely purified, cooled part is branched-off before it reaches the coldest zone; this part is cooled and purified in counter-current heat exchange with a cold mixture in a counter-current recuperator. The refrigerated impurities are deposited in the counter-current recuperator and subsequently removed therefrom by heating. Meanwhile, the cooling and the purification of the remaining gas current is performed in a second counter-current apparatus. These recuperators are large and costly and a frequent exchange thereof is unavoidable. Moreover, the temperature of the gas current cooled therein fluctuates, as well as the temperature of the subsidiary, or divisional current, which greatly handicaps its further use.

In conformity with this invention, the compressed gas mixture, for instance compressed air, is divided into main and subsidiary, or divisional currents, prior to separation. The main and the divisional currents are purified solely by cold-condensation and adsorption by adsorbents; the separated products are discharged in a direction which is reversed to the entering direction through the heat exchangers.

The division of the gas current in combination with a purification with adsorbent agents eliminates all the difficulties resulting from the revaporization of condensates at the cold end of the heat exchangers. No use is made of chemical reagents, such as for example the combination of carbon dioxide with sodium hydroxide, for the purpose of gas purification; therefore, there is no consumption of chemicals and their constant regeneration is not required.

Moreover, the conduct of the gas through the separating process is simplified. In the purification of the gas stream with an adsorptive agent, it is not necessary to continuously lower the temperature of the gas stream, which is the case if purification is effected by refrigeration, because an adsorptive agent essentially purifies the gas mixture at constant temperature. The guiding of a subsidiary current of cold gas in counter-current to the hot impure gas mixture in counter-current recuperators, for the purpose of removing the impurities from the gas mixture by refrigeration is not required. The purifying action of adsorption agents is superior to that effected at equal temperature by cooling and the gas treated by adsorption is particularly pure.

Four different embodiments of the process are recited, as follows.

1. The main current is purified by cooling only and the divided-off or subsidiary current by adsorption. The subsidiary current may be branched from the main current before or after entering heat exchangers or cold accumulators.

2. The entire gas mixture is first freed in the heat exchanger from a part of its impurities by cooling and from the residual part at a lower temperature by adsorption media; the divisional gas flow is branched-off from the main current at no earlier time than immediately after the current has passed through the adsorbent.

In either of these embodiments, the purified divisional subsidiary gas current may be 3. Expanded, either alone or in admixture with the cold purified main current, in order to yield energy, and 4. Heated in counter-current with itself, compressed at the surrounding temperature, again cooled, and brought into exchange with another current of cold gas mixture, to heat the latter in a controllable manner, before it is subjected to the energy-yielding expansion.

The adsorption medium is located in embodiment 1, outside the heat exchangers in containers which are arranged in pairs and are periodically reversible; one of these exchangers is charged while the other functions as adsorber.

The desorption is effected by the passage of a dry gas free from adsorbate, for example hot dry nitrogen in the case of air separation.

In embodiment 2, the adsorption agent is placed in the cold accumulator or between two sections of a counter-current heat exchanger. Desorption is effected during each reversion period with the aid of the escaping product of separation.

The invention may be applied with particular advantage to the separation of air in an apparatus provided with reversible cold accumulators and expansion turbines to serve as cold carriers.

The invention will now be described in detail and with reference to the accompanying Figs. 1 to 6, showing various embodiments thereof.

In view of the importance of the separation of air, the invention is described in connection therewith, without, however, being in any way limited thereto.

If, in accordance with the previously mentioned embodiment 1, the air current is divided before entering the regenerator, more gas will flow back therethrough over the entire length than has been entered into it. The consequence is, as can be shown by a heat balance, that the temperature difference between the entering and leaving gases is smaller at the cold end and greater at the warm end of the regenerator. The revaporization of the separated condensates at the cold end is accordingly facilitated. On the other hand, the greater temperature difference at the warm end constitutes a cold loss. In order to compensate for this loss with a small expenditure of energy, heat is withdrawn from the warm divisional or subsidiary current branched-off from the main stream by means of a refrigerating device, for example an ammonia refrigerating machine prior to its entrance into the separating device. It is advantageous to carry out the adsorption of the carbon dioxide at this temperature, with the assistance of the refrigerating machine.

Fig. 1 is a diagrammatic view of an installation for the separation of air into its components in conformity with the invention and its exchange with its separation products oxygen and nitrogen.

The compressed air passes from pipe 10 through pipes 60, 61 into a pair of reversing temperature exchangers 1, 3; the products of separation flow through the temperature exchangers 2, 4 and pipes 73, 74a into the pipes 11, 12.

A divided-off air flow comprising about 1–25 per cent of the original air flow is branched-off from the compressed air before it enters the temperature exchangers, flows through tube 64, is further compressed to about 15 atm. pressure in compressor 65, flows through tube 66 and is dried at a temperature of −45° C. in the vaporization coolers 5a, 5b of an ammonia circuit (partly shown) and passing through tubes 9. The air is conducted through tubes 75a, 76a, into the adsorbers 6a, 6b, which are filled with silica gel and also cooled by the ammonia circuit 9. Hereupon, the air is conducted through 67 into the countercurrent device 7, liquefied and fed through tube 80 into the pressure rectification zone 21 of the double column rectifier 8.

The main air current coming from the regenerators is separated in the usual manner, as shown in Fig. 1. The liquid rich in oxygen produced in the pressure rectification column 21 is taken off and conducted through tube 69 into the upper low pressure column after expansion. The liquefied nitrogen collected in the condensator of the pressure column 21 is conducted through 70a into the top of the upper column section in a liquid state after expansion. The gaseous nitrogen leaving the low pressure column at its top passes through tube 71, exchanger 2 at the very state of operation described for further utilization. The gaseous oxygen leaving the low pressure column at its lowest point passes through tube 72, exchanger 4 and tube 74a for further use.

The quantity of separation products discharged through the regenerators in this operation is slightly greater than the quantity of the introduced air. The ammonia refrigerating machine 5a, 5b compensates for the cold loss occurring at the warm end of the regenerators. The absorbers 6a and 6b are run alternately hot and cold in the same way as the ammonia precoolers 5a and 5b as described in the respective hot periods. The use of the adsorbers eliminates the consumption of soda lye in the purification of the branched-off high pressure air from carbon dioxide.

Figure 2:
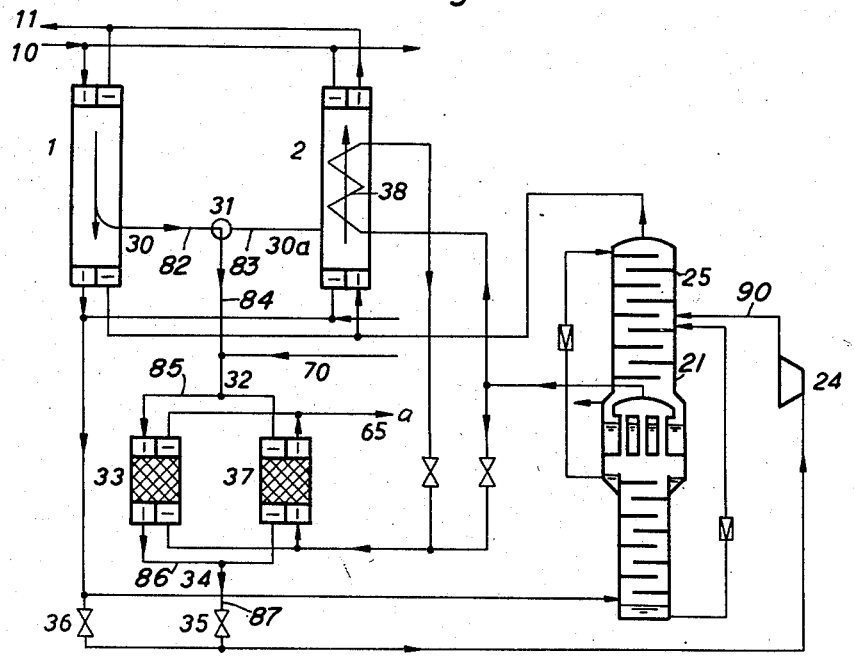

In the apparatus shown in Fig. 2, the subsidiary current is separated from the main current of the gas mixture, after the main current has been freed from part of its impurities by cooling and condensation in the upper part of the heat exchanger; thereafter the remaining impurities are removed by cooling from the main current in the further part of the cold accumulator and are removed from the branched-off subsidiary current by adsorption. Only the cold accumulator 1 for the air entering from the pipe 10 and the cold accumulator 2 for the nitrogen discharged into the pipe 11 are shown, the corresponding accumulators for air and oxygen not being shown although in practical work, they are used in the same manner. Depending upon the number of products of separation, further pairs of heat exchangers may be used and as main and subsidiary currents of equal number formed.

According to a further feature of the invention, it is sufficient to effect the division of the entering gas current in one pair of heat exchangers only, which is associated with one product of separation and in the present case with the nitrogen, and at the same time to effect the complete revaporization of the condensates in the colder part of the heat exchanger associated with the other separation product, which in this case, is the oxygen by ensuring that the quantities by weight of air to be cooled which are introduced, are smaller than the quantities by weight of products of separation (oxygen) which are discharged. The weight of air introduced into the nitrogen regenerator is greater than the weight of nitrogen leaving the warm end of the regenerator.

This arrangement simplifies the installation and the operation thereof.

The air enters the exchanger 1 from tube 10 and flows downward in the direction of the arrow. At the branch points 30, 30a of the heat exchangers 1, 2 a warm unpurified divisional portion of the air flow is withdrawn through tube 82 or 83 and through the change-over valve 31 situated therebetween; the divisional air current flows through tube 84, branch point 32, tube 85 to the adsorber 33, if desired together with a corresponding air current flowing through tube 70 from an oxygen regeneration, not shown. The air is freed in the adsorber 33 from carbon dioxide and acetylene and passes through tube 86, branch point 34, tube 87 and the regulating valve 35 together with cold air flowing through tube 88, valve 36, to the expansion turbine 24 and from there through tube 90 to the upper column 25 of the air separator 21.

In accordance with the requirements of the separation, a larger amount of divisional gas can be blown into the upper column in the installations for the production of an impure, such as 80 to 90% oxygen, compared with installations for the production of a purer, e. g. 98%, oxygen.

The quantity of the adsorbent is so controlled that it suffices for the purification of the divisional or subsidiary current over a large number of change-over, for example a week of change-over periods in the exchangers. The mass of the adsorbent suffices, in this case, to compensate for temperature fluctuations of the divisional current withdrawn at 30, which amount up to 50° C.

The uniformity of the cold production and the quality of the rectification in the upper column is hereby greatly improved. The accumulating action of the adsorbent may be further increased by adding cold-accumulating masses of high thermal capacity to the adsorbent.

The second adsorber 37 is in the desorption stage during the operation of the first adsorber.

For this purpose, a current of dry hot nitrogen, which is free from carbon dioxide, may be passed through the adsorber 37. This nitrogen can be taken, as apparent from Fig. 2, from the pressure column 25 and heated to desorption temperature in a tube 38 situated in the cold accumulator and then forced through the adsorber 37; it leaves the adsorber 37 with a carbon dioxide content at 65a.

Before the plant is set in operation, the adsorber 37 is cooled by cold nitrogen coming direct from the pressure column 25 to the temperature at which the adsorber 33 is operated. The nitrogen leaving the accumulator 2 in the dry state in the second half of each discharge period is available as desorption medium. The cold required for the cooling of the adsorbers can be provided without difficulty because the cooling can be extended over a long period, for instance, a number of days.

Figure 3:
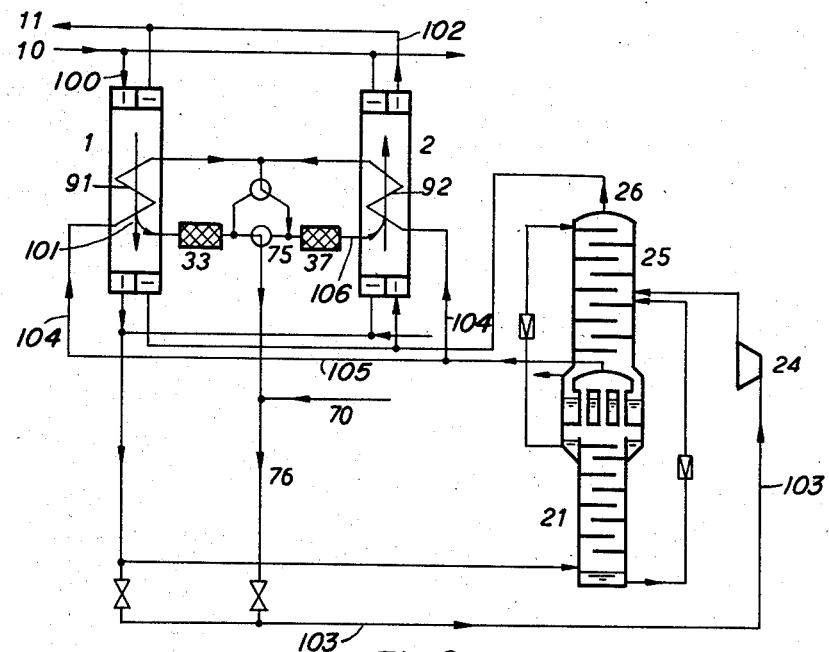

Fig. 3 illustrates a third embodiment of the invention.

Here the air passes from pipe 10 through pipe 100 into the heat exchanger 1. The divisional gas flow is separated from the main flow at 101, after the main flow has been freed from part of its impurities in the upper part of the exchanger 1.

For the sake of simplicity, only two exchangers 1 and 2 are shown for the treatment of the air entering through tubes 10, 100 and for the nitrogen being discharged through pipes 102 and 11 and the appertaining adsorbers 33, 37.

These adsorbers are charged with a small quantity of silica gel, which is sufficient to free the air flow passing during one working period through the exchangers and the flow recovery valve 75 by way of the pipes 76, 103 to the turbine 24.

At the same time, the adsorber 37 is traversed by a small quantity of dry carbon dioxide free nitrogen, coming from the preheating coils 91 or 92 and supplied through pipes 104 and 105 from the pressure column 21, the nitrogen being preheated slightly above the temperature of the adsorber charge; this small quantity of nitrogen is sufficient to remove the quantity of carbon dioxide adsorbed by the air in the preceding period.

As soon as the operation of the exchanger 2 is started, a divisional air flow passes from the same through tube 106, adsorber 37, tubes 75, 76, 103 into the turbine 24 while the adsorber is purified. The advantage of this method of operation as compared with that previously described resides in the small expenditure of adsorbent and the size reduction of the apparatus required.

Due to the separation of the divisional gas current in the exchangers or regenerators shown in Figs. 2 and 3, the divisional gas current, is already freed when it enters the adsorber from part of its impurities by refrigeration in the exchangers. The consumption of the adsorbents is smaller than with the embodiment of Fig. 1. Apart from the advantage of the saving of adsorbent and the guarantee of an unimpeded operation of the cold regenerator parts, the purified divisional gas current is a convenient means of preheating the gas to be expanded and consequently of controlling the cold economy of the separator.

The embodiment of the invention which will now be described with reference to Fig. 4, affords an even greater simplicity than those already described.

The adsorbent is located directly into the heat exchanger; if alternately traversed by unpurified gas mixture and the products of its separation, the gas is purified during charging and discharging and the adsorbent is desorbed. In the upper part of the regenerator, water and the main quantity of carbon dioxide are condensed and revaporized, whereafter the remainder of the carbon dioxide is adsorbed by the adsorbent and desorbed.

The charging of the adsorbents fluctuates hereby on the inflow side of the impure gase between saturation and a value slightly below the same, while at the side where the purified air is discharged, the charging of the gel fluctuates between very small degrees of saturation. External containers for the adsorbent are not required so that the changing-over of such containers is eliminated.

The air enters the exchangers 1, 2 through tubes 10, 106, 107.

The divisional air current is branched-off in the exchangers flowing in the direction of arrows 108, 109 below adsorbers 13, 15; the same takes place in exchangers 2, 4 below the adsorbers 14, 16 if the air is entered into these exchangers. The main air stream passes to the cold end of the exchanger, no further condensates being evaporated. The position of the branching-off point in the regenerator, and consequently, that of the adsorbent in the accumulators, as well as the temperature and the quantity of the divisional current, is so selected that the compensation for the quantity of heat transferred by the gases flowing in and out takes place in the lower part of the accumulator. Moreover, care must be taken that above the adsorbent layer, or in that part of the exchanger, between this layer and the warm end of the regenerator, an undisturbed condensation and revaporization takes place of the air impurities without the application of auxiliary measures.

Figure 4:
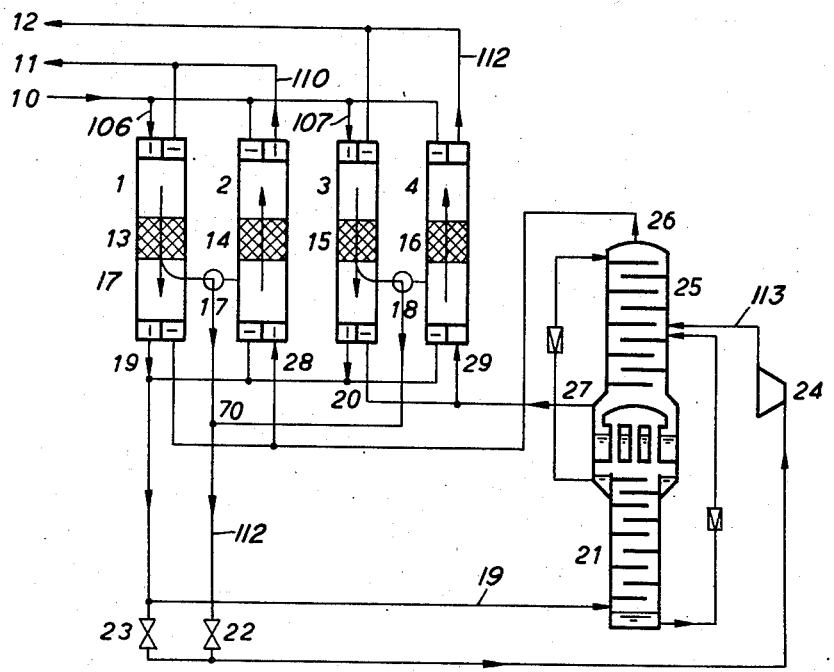

In the embodiment of Fig. 4, the regenerators employed as heat exchangers may be replaced by tubular counter-current recuperators having interchangeable cross-sectional areas, through which the compressed gas and its products of separation flow alternately. In this case, the counter-current recuperators are sub-divided and an adsorber is disposed between the parts in the path of the gas to be cooled and of the gas to be preheated. The purified divisional gas current is branched-off after passing through the adsorbent layer.

The air separating installation, shown in Fig. 4, comprises a double rectifier consisting of a high pressure column 21 and a low pressure column 25 and four temperature exchangers 1, 2, 3, 4 for the air entering from pipe 10 and pipes 106, 107 into the exchanger pair 1, 3. The products of separation viz. nitrogen and oxygen, escape through the exchangers 2, 4 and pipes 110, 11 and 112, 12. The exchangers are charged with a filler whereby water is condensed and revaporized. The chambers 13, 14, 15, 16 accommodate an adsorptive medium for example silica or alumina gel, which adsorbs the carbon dioxide and the acetylene of the air. A part of the air is divided-off laterally from the main currents flowing in the direction indicated by arrows 108, 109 through the exchangers and from the same at 17 and 18. The main air flow is low-cooled in the exchangers and then conducted through tubes 19, 20 for pre-separation into pressure column 21. The divisional air current is conducted through tube 112 to the turbine for expansion and cold production and is hereafter blown through tube 113 into the upper column section 25.

Rectification takes place in the usual manner.

Cold air taken from the main air flow through tube 19 may be admixed with the divisional air flow passing through tube 112 by means of valves 23, 22 when the expansion of the divisional air flow does not provide sufficient cold. The separation products, nitrogen and oxygen, are fully discharged from the regenerators 2 and 4, respectively, along lines 26, 28 and 27, 29 and the air impurities adsorbed by adsorbent gel and condensed in the accumulators are desorbed and vaporized, respectively. A substantially greater quantity of gas now leaves through the cold part of the accumulators at the point where the difference between the quantity of compressed air and the quantity of expanded gases entering therethrough is particularly great, this difference being caused by the quantity of the branched-off current. This quantity depends upon the requirements of the separation; it is calculated from the quantities flowing towards and away from the point of division during the warm and cold periods of the accumulator, from the specific heat and from the temperature of the gases. The quantity of the divisional current may be proportionally increased as the temperature in the accumulator at the point of division decreases. The temperature after the expansion naturally must not sink to, or below, the dew point of the expanded gas. However, the point of division can be so selected that the quantity of the divisional current suffices to provide all the necessary cold by its expansion alone; this particularly refers to the apparatus, shown in Fig. 4, and also to that described in Figs. 2 and 3.

In accordance with a further embodiment of the invention, the purified divisional gas current is heated in counter-current with itself, compressed at the normal temperature, recooled in counter-current and brought into heat exchange with cold pure gas to be expanded, for the purpose to preheat the latter before it is work rendering expanded.

The intensity of the initial heating is controlled by the amount of the divisional current and the pressure to which it is compressed. The pressure determines the extent to which the divisional current liquefies in cold exchange with the gas to be preheated and yields its condensation heat. The intensity of the initial heating of the divisional current can thus be conveniently adapted to the varying quantity of gas flowing to the turbine. The cold economy of the gas separation apparatus can thus be better controlled.

Figure 5:
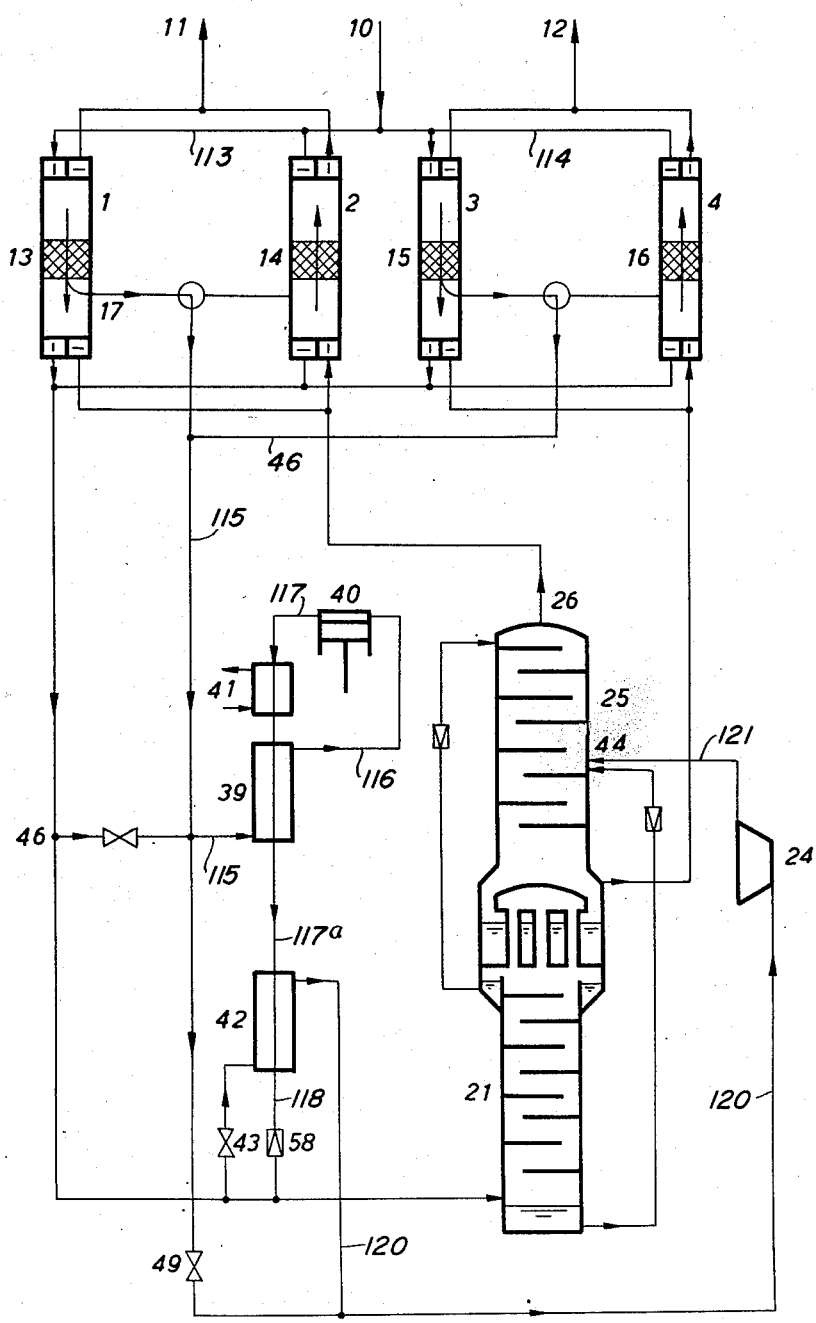

Fig. 5 illustrates this method of operation as applied to an air separating plant, where reversible temperature exchangers 1, 2, 3, 4 provided with layers 13, 14, 15, 16 of an adsorbent material are operated in the manner described with reference to Fig. 4. The air is entered through pipe 10 and pipes 113 and 114 into exchangers 1, 2; nitrogen is conducted through tube 11 and oxygen through tube 12.

The divided-off air flow branched off at 17 from exchanger 1 is conducted through tube 115 into the counter-current heat exchanger 39, together with an air current coming from the exchanger 3 through tube 116 and, if desired, together with an additional quantity of air flowing through tube 46. The air is conducted through tube 116 into the compressor 40 and after the dissipation of the compression-produced heat through tube 117 into the cooler 41 and into the temperature exchanger 39, where it is recooled. Hereafter, the air is conducted through tube 117a into the countercurrent apparatus 42. There it is brought into exchange with cold air flowing from the exchangers 1, 3 through tube 4 and controlled by valve 43; the air is partially or completely liquefied in the countercurrent apparatus 42 and passed through tube 118 over valve 58 into the pressure column 21. The heated air passing through valve 43 is conducted through tube 120 into expansion turbine 24 and entered through tube 121 into the upper pressure column 44. The rectification is effected in the usual manner. It is also possible to take the air current from the cold end of the regenerator or from below the first plate of the pressure column, since the compressed subsidiary air current is cooled in exchange with itself, that is to say, with the still uncompressed aspirated divisional air current, only to the temperature of the commencement of its condensation; in this manner, the air to be expanded is initially heated in exchange with the compressed subsidiary air circuit to the approximate condensation temperature of the subsidiary current, which amounts to about 122° K in the case of air at a pressure of 20 atmospheres, while the air at the outlet end of the regenerator has an average temperature of about 100° K. A part of the subsidiary current can be fed directly to the expansion turbine through the valve 49.

Even if the subsidiary current is branched-off from the main current and purified, in the manner described with reference to Figs. 2 and 3, the method of recompressing, recooling and further using it for the initial heating of the expansion gas, as described with reference to Fig. 5, can be employed.

Figure 6:
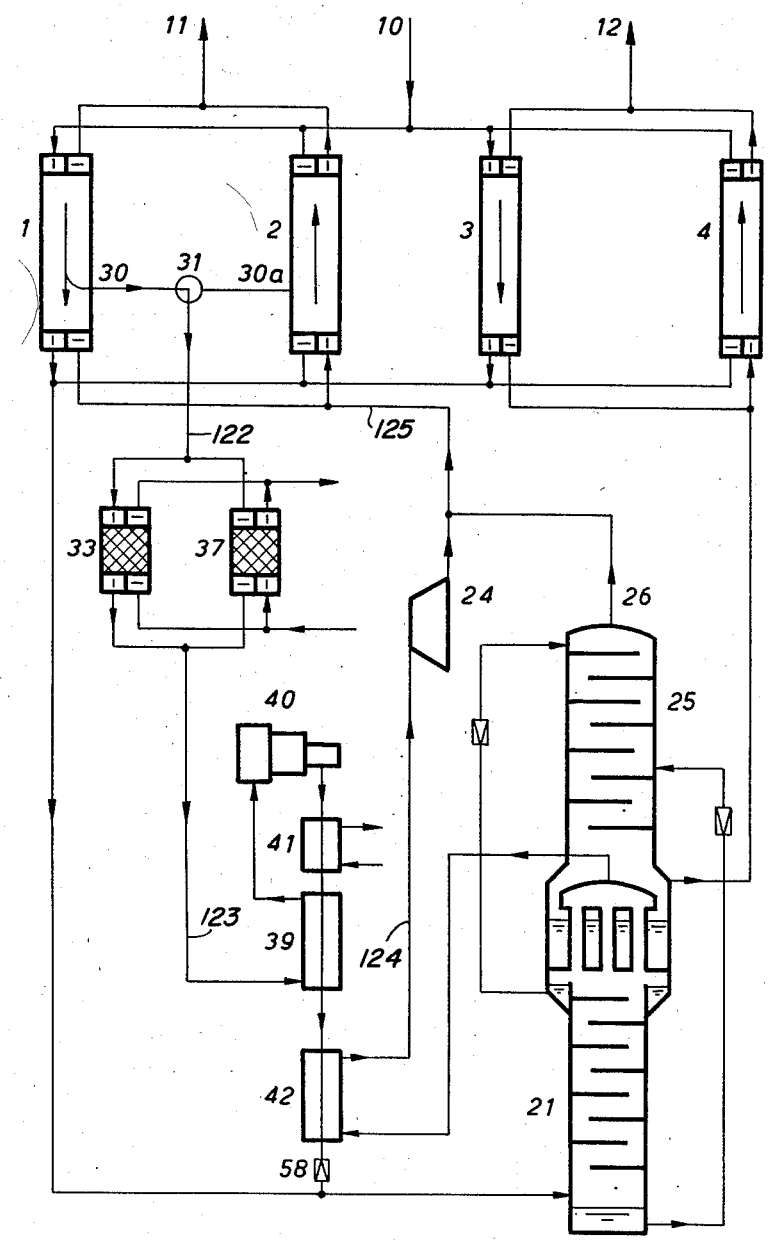

Fig. 6 shows a method of carrying this working principle into effect.

The divisional air current branched-off from the temperature exchangers 1 or 2 at 30, or 30a is recompressed, conducted through pipe 122 into and through adsorber 33 and recooled, as described in connection with Fig. 5. It is hereupon conducted through pipe 123 into countercurrent apparatus 42 where it heats compressed nitrogen; the nitrogen is conducted through tube 124 into the turbine 24 and supplies its cold content to the temperature exchangers over tube 125. Instead of compressed nitrogen, air may be initially heated, as shown in Fig. 5, with the divisional current branched-off at 30, 30a.

In the oxygen regenerators, the revaporization is secured by the fact that 2% by weight less air is introduced than oxygen is discharged. The tapping-off of a subsidiary air current is unnecessary. A corresponding illustration of the oxygen regenerators is given in Fig. 6.

The method described with reference to Figs. 5 and 6 is principally applicable to the separation of air. The advantage of this method lies in the simplicity of the construction, the accessibility of the adsorbers, the adaptability of the apparatus to the varying cold requirement, for example when the air separator is frequently stopped and restarted, the continuous readiness of the regenerators for operation and, finally, the low energy consumption during the air separation, due to the economical handling of the cold.

The invention is also applicable to gas mixtures other than air. In addition to carbon dioxide and acetylene, other impurities of the gas mixture may be removed. Moreover, the process can be applied to the purification of combustible gases by low cooling by means of cold accumulators. Gas mixtures can be separated within the scope of the process of the invention, by methods other than the rectification mentioned in the examples, for example with washing agents.

Since certain changes in carrying out the above process could be made without departing from the scope thereof, it is intended that all matter contained in the above description or shown in the accompanying drawing shall be interpreted as illustrative and not in a limiting sense.

Having thus described the invention, what we claim as new and desire to be secured by Letters Patent, is as follows:

1. A process for separating carbon dioxide and water from compressed air for the purpose of its decomposition into its components comprising conducting the air into two reversible temperature exchangers, cooling the air and removing water from the same by condensation, dividing the air into main and divisional portions prior to its completed passage through said temperature exchangers in one direction, purifying said divisional portions by adsorption of their carbon dioxide contents with an adsorbent at the respectively low temperature and exteriorly of said exchangers within a pair of adsorbers operatively associated with said temperature exchangers, while passing the main portions completely through said exchangers in one direction, separating the gaseous components from said main and said divisional portions by rectification in high and low pressure chambers, operating said pair of adsorbers with a change-over period which is a multiple of the reversion period of the temperature exchangers, thereafter passing said separated components through said exchangers in a reversed direction and opposite to said one direction, conducting the compressed air through said reversible temperature exchangers, withdrawing a vaporous portion from the high pressure chamber, then passing it in a heat exchange relationship through a temperature exchanger to warm this portion, using the so warmed portion to regenerate the adsorbers, combining the divisional portion and a part of said main portion and work-expand it in a turbine and introducing the same into said low pressure chamber.

2. In a process according to claim 1, the steps of effecting the division of the gas flow in the pair of exchangers which is associated with one decomposition compound, whereas in the heat exchangers associated with the other decomposition products a smaller amount of the gas mixture to be cooled is introduced compared with the amount of decomposition products, which are discharged therefrom.

3. In a process as claimed in claim 1, said step of passing a vaporous portion in heat exchange relationship including passage thereof through both temperature exchangers.

References Cited in the file of this patent

UNITED STATES PATENTS

| | | |
|---|---|---|
| 2,460,859 | Trumpler | Feb. 8, 1949 |
| 2,503,939 | De Baufre | Apr. 11, 1950 |
| 2,537,046 | Garbo | Jan. 9, 1951 |
| 2,572,933 | Houvener | Oct. 30, 1951 |

FOREIGN PATENTS

| | | |
|---|---|---|
| 373,918 | Great Britain | June 2, 1932 |
| 103,634 | Sweden | Feb. 3, 1942 |